(12) United States Patent
Hasegawa et al.

(10) Patent No.: US 7,969,227 B2
(45) Date of Patent: Jun. 28, 2011

(54) TEMPERATURE DETECTION CIRCUIT

(75) Inventors: Ryuta Hasegawa, Hino (JP); Ryuichi Morikawa, Higashimurayama (JP); Nobumitsu Tada, Hachioji (JP); Masami Hirata, Yokkaichi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/906,715

(22) Filed: Oct. 18, 2010

(65) Prior Publication Data

US 2011/0032001 A1 Feb. 10, 2011

Related U.S. Application Data

(63) Continuation of application No. PCT/JP2009/057775, filed on Apr. 17, 2009.

(30) Foreign Application Priority Data

Apr. 18, 2008 (JP) .................................. 2008-109354

(51) Int. Cl.
H03K 3/42 (2006.01)
(52) U.S. Cl. ........................................ 327/512; 374/163
(58) Field of Classification Search .................. 327/512, 327/513; 374/170, 163
See application file for complete search history.

(56) References Cited

U.S. PATENT DOCUMENTS

| 7,731,417 B2 * | 6/2010 | Kumagai | 374/1 |
| 2008/0238529 A1 * | 10/2008 | Kumagai | 327/512 |

FOREIGN PATENT DOCUMENTS

| JP | 3-139105 | 6/1991 |
| JP | 10-210790 | 8/1998 |
| JP | 2001-169401 | 6/2001 |
| JP | 2003-294543 | 10/2003 |

OTHER PUBLICATIONS

International Preliminary Report on Patentability with Written Opinion issued on Dec. 29, 2010, in PCT/JP2009/057775 filed Apr. 17, 2009.
International Search Report issued Jul. 7, 2009 in PCT/JP2009/057775 filed Apr. 17, 2009 with English translation.

* cited by examiner

Primary Examiner — Long Nguyen
(74) Attorney, Agent, or Firm — Oblon, Spivak, McClelland, Maier & Neustadt, L.L.P.

(57) ABSTRACT

According to one embodiment, a temperature detection circuit is provided which requires only a small number of additional components, thus minimizing an increase in costs and which offers an insulating property and high responsiveness. A temperature detection circuit outputs a first PWM signal corresponding to a temperature of a first temperature sensor from a photointerrupter as a signal insulated from the first temperature sensor. A temperature detection circuit outputs a second PWM signal corresponding to a temperature of a second temperature sensor from a photointerrupter as a signal insulated from the second temperature sensor. A controlling arithmetic apparatus calculates a higher one of the temperatures detected by the first and second temperature sensors based on the PWM signals output from the photointerrupter.

8 Claims, 8 Drawing Sheets

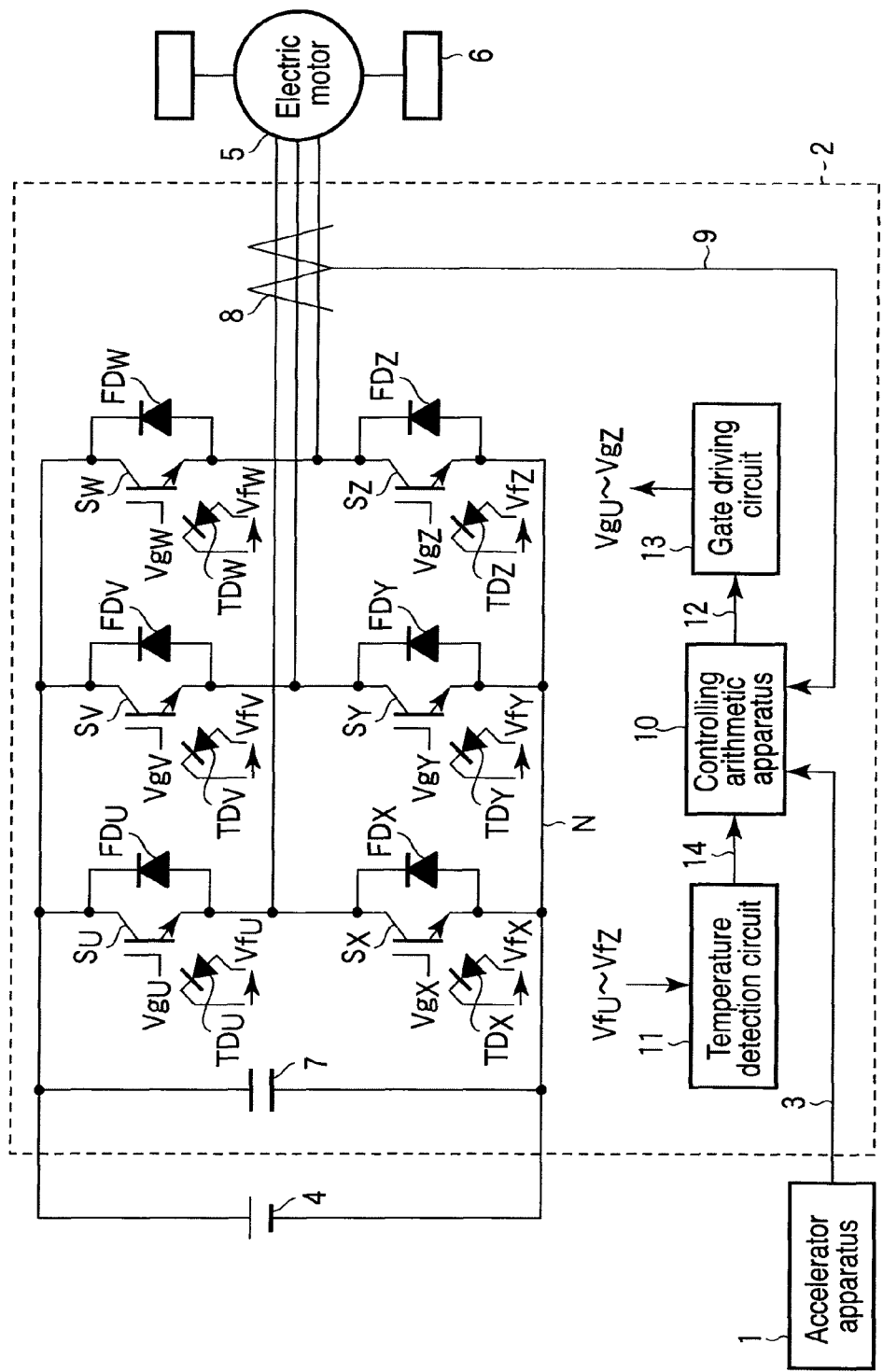
F I G. 1

TEMPERATURE DETECTION CIRCUIT

CROSS REFERENCE TO RELATED APPLICATIONS

This is a Continuation Application of PCT Application No. PCT/JP2009/057775, filed Apr. 17, 2009, which was published under PCT Article 21(2) in Japanese.

This application is based upon and claims the benefit of priority from Japanese Patent Application No. 2008-109354, filed Apr. 18, 2008; the entire contents of which are incorporated herein by reference.

FIELD

Embodiments described herein relate generally to a temperature detection circuit, and in particular, to detection of temperature of a switching element included in an inverter apparatus.

BACKGROUND

An electric motor is used as a power source for a hybrid car in which the electric motor is combined with an engine, an electric car, or the like. To drive the electric motor, an inverter is used to obtain a predetermined torque and a predetermined frequency. The inverter is incorporated in the car, and there has been a demand for a reduction in the size of the inverter and an increase in the power of the inverter in order to provide an on-board space.

In a hybrid car in which the operating temperature of the inverter varies significantly depending on the driving environment of the car, particularly in which the inverter is mounted in an engine compartment, the inverter becomes very hot as a result of heat generated by the engine. The temperature of a switching element in the inverter is raised not only by the above-described ambient temperature but also by a steady-state loss resulting from the flow of a current through the switching element itself and a switching loss resulting from switch-on and switch-off operations. The switching element may be destroyed if the temperature exceeds a certain value.

In order to avoid destroying the switching element, a method has been proposed in which the temperature of the switching element is detected so as to allow the inverter to be cooled based on the information obtained or in which the temperature of the switching element or inverter is measured to allow a torque or a switching frequency to be limited. A voltage of a PN junction semiconductor element such as a diode varies linearly depending on temperature. Accurate, highly responsive temperature information is obtained by observing the voltage of a diode installed near the switching element as a temperature detection sensor. The accurate temperature information obtained allows the torque to be output until the temperature of the switching element becomes close to its breakdown temperature. This is expected to enable an increase in the density of inverters.

In Patent Document 1, the torque limitation is started when the temperature of the switching element exceeds a certain value and is varied in proportion to the raised temperature and a temperature change rate.

This technique allows the switching element to be prevented from generating heat, thus avoiding destruction of the switching element.
Prior Technical Document
Patent Document Patent Document 1: Jpn Pat. Appln. KOKAI Publication No. 10-210790

BRIEF DESCRIPTION OF THE DRAWINGS

FIG. 1 is an inverter circuit and a control block according to an embodiment of the present invention;

DETAILED DESCRIPTION

Figure 2:
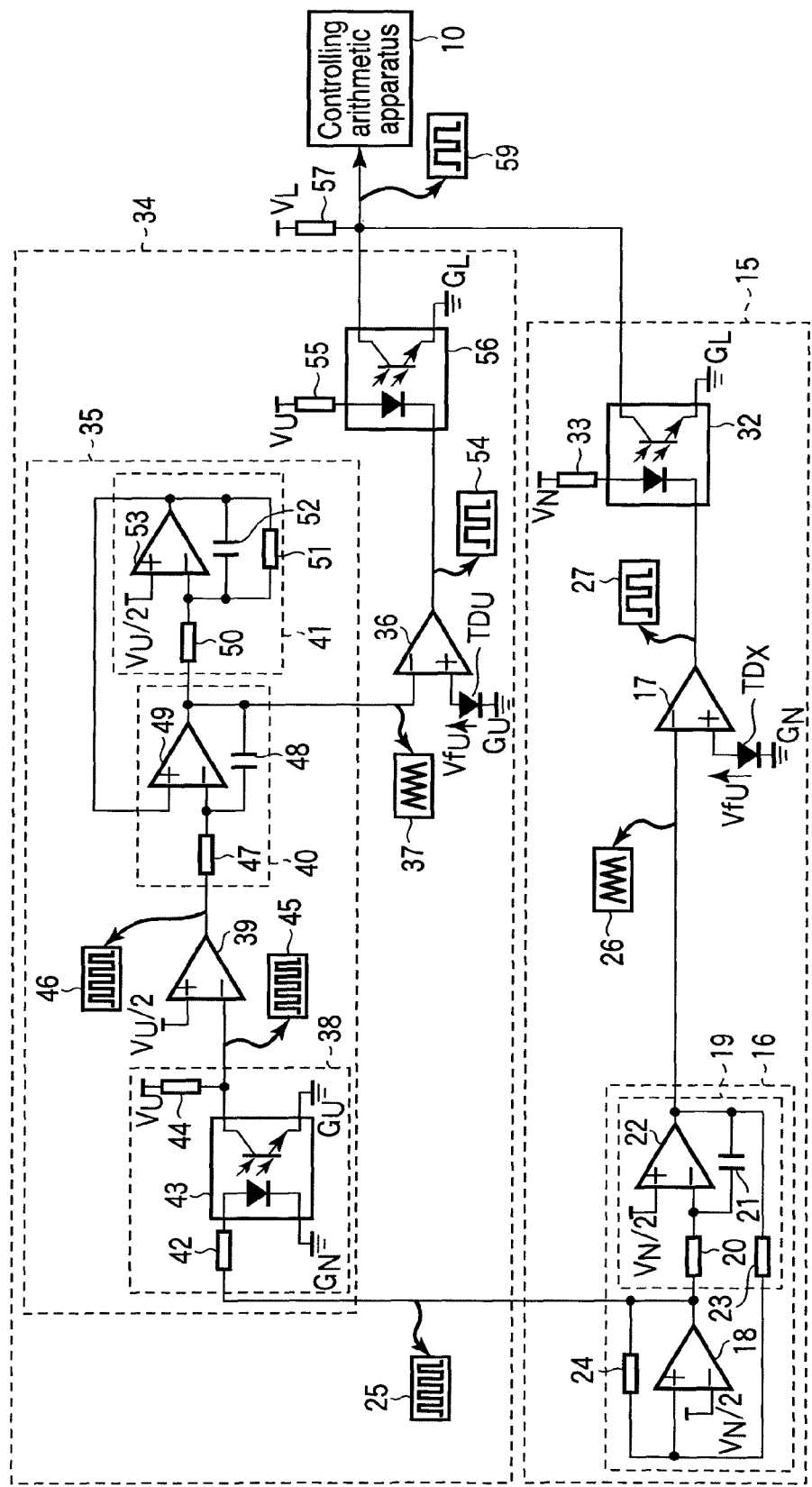
FIG. 2 is a diagram showing a temperature detection circuit according to Embodiment 1 of the present invention.

In general, according to one embodiment, there is provided a temperature detection circuit comprising a first temperature detection circuit section including a first temperature sensor, and a second temperature detection circuit including a second temperature sensor and insulated from the first temperature detection circuit section, the temperature detection circuit being characterized in that:

the first temperature detection circuit section comprises:

a first comparison circuit configured to output a first square wave;

a first integration circuit configured to integrate the first square wave to output a first triangular wave;

a second comparison circuit configured to compare the first triangular wave with a temperature value obtained from the first temperature sensor to output a first PWM signal; and a first insulation circuit configured to insulate the first PWM signal to output a second PWM signal corresponding to the first PWM signal, the second temperature detection circuit section comprises:

a second insulation circuit configured to insulate the first square wave to output a second square wave corresponding to the first square wave;

a second integration circuit configured to integrate the second square wave to output a second triangular wave;

a second comparison circuit configured to compare a temperature value obtained from the second temperature sensor with the second triangular wave to output a third PWM signal; and a third insulation circuit configured to insulate the third PWM signal to output a fourth PWM signal corresponding to the third PWM signal, and the temperature detection circuit comprises arithmetic means for calculating a higher one of the temperatures detected by the first and second temperature sensors based on the second and fourth PWM signals output by the first and third insulation circuits, respectively.

A temperature detection circuit according to the present invention will be described below with reference to the drawings. The same components are denoted by the same reference numbers, and duplicate descriptions are omitted.

General Configuration

FIG. 1 shows a configuration in which the temperature detection circuit according to the present invention is applied to an inverter apparatus for an electric car. The temperature detection circuit according to the present invention is applicable not only to inverter apparatuses but also to applications in which temperature information is obtained from a plurality of temperature sensors that need to be insulated from one another.

The inverter apparatus receives a torque instruction value 3 from an accelerator apparatus. In accordance with the torque instruction value 3, the inverter apparatus converts an output voltage from a DC power source 4 into an AC voltage of a desired frequency and a desired magnitude. The inverter apparatus then drives an electric motor 5 to control rotation of wheels 6. An inverter 2 is connected to the electric motor 5 via three wires to drive the electric motor 5 by three-phase AC power.

The inverter 2 comprises a capacitor 7 connected to an input stage to smooth a DC voltage. Switching elements form each of bridge circuits for a U phase, a V phase, and W phase, respectively. In the U-phase bridge circuit, the junction between a switching element $S_U$ and a switching element $S_X$ is connected to the electric motor 5 by an electric wire. A current sensor 8 is installed on the electric wire so that a current magnitude 9 obtained can be input to a controlling arithmetic apparatus 10. Reflux diodes $FD_U$ and $FD_X$ are connected in antiparallel with the switching elements $S_U$ and $S_X$, respectively.

The V- and W-shape bridge circuits are similarly configured; the V-phase bridge circuit comprises switching elements $S_V$ and $S_Y$ and reflux diodes $FD_V$ and $FD_Y$ and the W-phase bridge circuit comprises switching elements $S_W$ and $S_Z$ and reflux diodes $FD_W$ and $FD_Z$.

Temperature sensors $TD_U$ to $TD_Z$ are provided near the switching elements $S_U$ to $S_Z$, respectively. In the present embodiment, temperature sensors $TD_U$ to $TD_Z$ are diodes. The diode 11 serving as the temperature sensor is formed on the same semiconductor chip on which the switching element and the reflux diode are formed, in proximity to the switching element and the reflux diode. Thus, the diode 11 can accurately detect the temperature of the switching element. The diode has the property of generating a forward voltage decreasing with increasing temperature under a constant-current condition. The temperature of the switching element is obtained by measuring a forward voltage generated by the diode to which a given current is supplied. Temperature sensors $TD_U$ to $TD_Z$ may be elements other than diodes but are desirably highly responsive and very accurate. Voltages $Vf_U$ to $Vf_Z$ output by temperature sensors $TD_U$ to $TD_Z$ are input to the controlling arithmetic apparatus 10 through the temperature detection circuit 11.

The controlling arithmetic apparatus 10 outputs such a gate signal 12 as allows a desired torque to be obtained, to a gate driving circuit 13 based on the torque instruction value 3 input by the accelerator apparatus 1 and a current magnitude fed back by the current sensor 8. Furthermore, the controlling arithmetic apparatus 10 calculates the temperature of each switching element based on a signal 14 input by the temperature detection circuit. If the switching element may be destroyed by a rise in temperature, the controlling arithmetic apparatus 10 takes various protective means.

The gate driving circuit 13 is connected to all the gates of the switching elements $S_U$ to $S_Z$ to switch among gate voltages $Vg_U$ to $Vg_Z$ in accordance with a gate signal 12 input by the controlling arithmetic apparatus 10. The inverter apparatus is generally configured as described above.

Embodiment 1

FIG. 2 is a diagram showing the configuration of the temperature detection circuit that measures the temperatures of the switching elements $S_U$ and $S_X$. Temperature sensors $TD_U$ and $TD_X$ are installed in proximity to the switching elements $S_U$ and $S_X$. Thus, a voltage of at least several hundred volts is applied to temperature sensors $TD_U$ and $TD_X$ as is the case with the switching elements, depending on whether the switching elements are turned on or off. In order to prevent temperature detection circuits from being destroyed even at such high voltages, the detection circuits including temperature sensors need to be insulated from each other.

First, the temperature detection circuit 15 for switching element $S_X$ will be described in detail. The temperature detection circuit 15 operates at a power supply voltage $V_N$ and a reference potential $G_N$ and comprises a triangular-wave generation circuit 16 and a comparator 17.

The triangular-wave generation circuit 16 comprises a comparator 18 and an integration circuit 19. The integration circuit 19 comprises a resistor 20, a capacitor 21, and an operational amplifier 22. An operation of generating a triangular wave will be described. First, it is assumed that an output terminal of the comparator 18 is in a low state. The capacitor 21 discharges through the resistor 20 to gradually increase the output terminal voltage of the operational amplifier 22. The non-inverting input terminal potential of the comparator 18 is equal to an output from the operational amplifier 22 and an output from the comparator 18 divided by the resistors 23 and 24. An output terminal of the comparator 18 is fixed to the initial low state. An output voltage from the operational amplifiers increases, and the potential of a non-inverting input terminal of the comparator 18 increases. Moreover, when the potential of a non-inverting input terminal of the comparator 18 exceeds the potential (half of a power supply voltage $V_N$) of an inverting input terminal of the comparator 18, the output terminal changes from the low state to a high state. The capacitor 21 is charged through the resistor 20, and an output voltage from the operational amplifier 22 decreases from the high state to the low state. The potential of the non-inverting input terminal of the comparator 18 divided by the resistors 23 and 24 also decreases down to at most the potential $V_N/2$ of the inverting input terminal. Then, the output terminal of the comparator 18 changes back to the low state, that is, the initial state. Then, the operation is repeated. As a result, a square wave 25 is output from the output terminal of the comparator 18. A triangular wave 26 is output from the output terminal of the operational amplifier 22.

The output terminal of the operational amplifier 22, from which the triangular wave 26 is output, is connected to the inverting input terminal of the comparator 17. A forward voltage $Vf_X$ from temperature sensor $TD_X$ is applied to the non-inverting input terminal of the comparator 17. An anode of temperature sensor $TD_X$ is connected, for example, to the power supply $V_N$ of the temperature detection circuit 15 via a resistor. When $Vf_X$ is higher than the voltage of the triangular wave, the output from the comparator 17 is in the high state.

Otherwise, the output from the comparator 17 is in the low state. A PWM signal 27 is generated through the output terminal.

Figure 3:
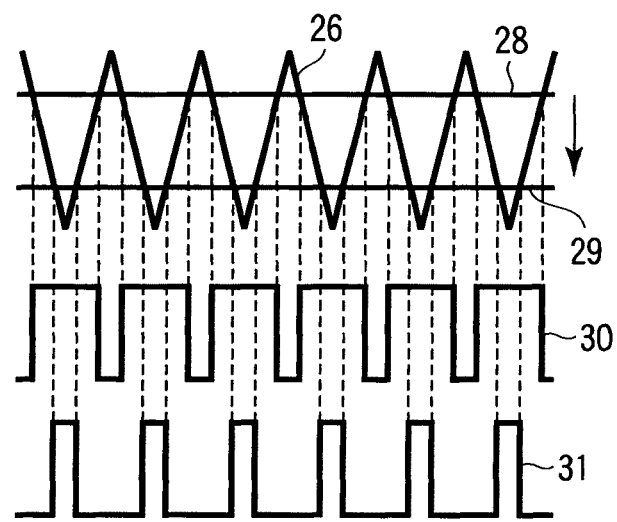
FIG. 3 is a diagram showing time series variations in the voltage of a temperature sensor, a triangular wave, and a PWM signal according to Embodiment 1 of the present invention.

In the present embodiment, the diode generating a forward voltage decreasing with increasing temperature is used as a temperature sensor. As shown in FIG. 3, as the temperature rises, the forward voltage decreases from 28 to 29, and the on pulse width (high level signal width) of the PWM signal shortens from 30 to 31. For some applications, the relationship between the non-inverting input terminal and inverting input terminal of the comparator may be inverted so that the on pulse width increases consistently with the temperature.

The PWM signal 27 is transmitted to a low-voltage side through a photocoupler 32 with an open collector or open drain output and a current limiting resistor 33. The PWM signal 27 is input to a cathode of an input diode in the photocoupler 32. The PWM signal 27 is connected to an anode of the photocoupler input, and a cathode of the photocoupler input is grounded. Then, the on pulse width increases consistently with the temperature. Also in this case, the connection may be changed as required.

Now, the configuration and operation of a temperature detection circuit 34 for switching element $S_U$ will be described. The circuit 34 comprises a triangular-wave insulating synchronous circuit 35 and a comparator 36. The circuit 34 operates based on the power supply $V_U$ and a reference potential $G_U$ insulated from the power supply $V_U$ and reference voltage $G_N$ of the temperature detection circuit 15.

As described above, the triangular-wave insulating synchronous circuit 35 is insulated from the temperature detection circuit 15 for switching element $S_X$ and generates a triangular wave 37 synchronizing with the triangular wave 26. The triangular-wave insulating synchronous circuit 35 comprises an insulating circuit 38, a comparator 39, an integration circuit 40, and an inversion filter circuit 41. Roughly speaking, the triangular-wave insulating synchronous circuit 35 integrates the square wave 25 incidentally generated by the triangular-wave generation circuit 16 to generate the triangular wave 37 having a waveform almost the same as that of the triangular wave 26.

First, the square wave 25 generated by the triangular-wave generation circuit 16 is input to the insulating circuit 38. The insulating circuit 38 comprises an input resistor 42 configured to limit a current, a photocoupler 43, and a pullup resistor 44. A square wave 45 insulated from the temperature detection circuit 15 is output through the photocoupler 43. When in the low state, the square wave 45 has a voltage slightly higher than the reference voltage $G_U$. Thus, the square wave 45 has a waveform different from that of the square wave 25. This prevents the insulating synchronous triangular wave 37 from having a waveform the same as that of the triangular wave 26. This problem can be avoided by providing the comparator 39 with capabilities the same as those of the comparator 18 and inputting the square wave 45 to the inverting input terminal so that the low potential of a square wave 46 is shifted to the low potential of the square wave 25.

The square wave 46 output by the comparator 39 is input to the integration circuit 40. Like the integration circuit 19, the integration circuit 40 comprises a resistor 47, a capacitor 48, and an operational amplifier 49. Furthermore, the resistor 47 and the capacitor 48 are selected such that the integration circuit 40 has a time constant the same as that of the integration circuit 19. If the high and low states of the square wave 46 share the total period half and half (duty ratio: 50%), the integration circuit 40 generates a triangular wave. However, in actuality, the high and low states of the triangular wave 46 do not share the total period half and half but are slightly different from each other in length. As a result, an output from the integration circuit 40 is saturated to either the positive side or the negative side, failing to output a triangular wave.

Thus, the output from the integration circuit 40 is input to the filter circuit 41. An output from the filter circuit 41 is fed back to a non-inverting input terminal of the operational amplifier 49 in the integration circuit 40. The filter circuit 41 comprises resistors 50 and 51, a capacitor 52, and an operational amplifier 53. The resistor 50 and the capacitor 52 are selected such that the time constant is sufficiently larger than the period of the time constant.

Figure 4:
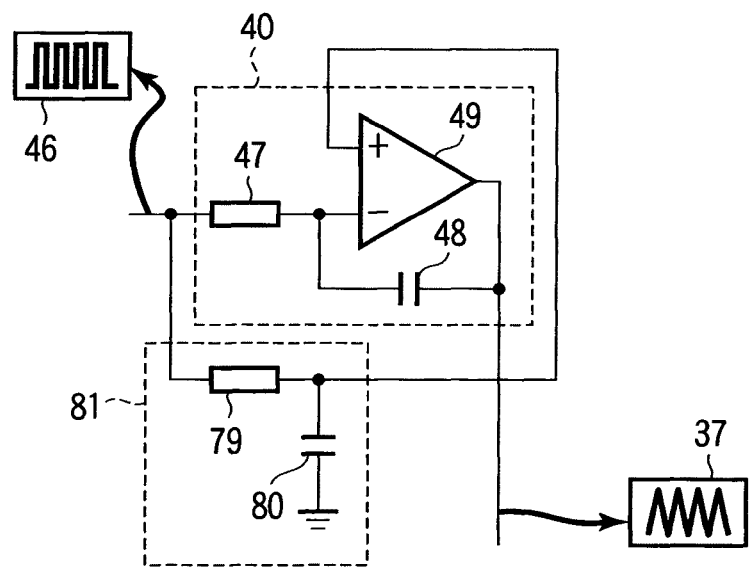
FIG. 4 is a diagram showing a temperature detection circuit according to Embodiment 1 of the present invention.

A circuit operation for avoiding the saturation will be described below. For example, if an output voltage from the integration circuit 40 increases and starts to be saturated toward the positive side, the capacitor 52 is charged through the resistor 50 to reduce an output voltage from the operational amplifier 53. The potential of a non-inverting input terminal of the operational amplifier 49, this potential being the same as the output voltage of the operational amplifier 53, also decreases. Thus, the potential of a virtually short-circuited inverting input terminal also decreases. This increases a current flowing from the comparator 39 through the resistor 47 to the integration circuit 40. The output voltage from the operational amplifier 49 decreases. In this manner, the output from the integration circuit 40 can generate a triangular wave 37 without being saturated toward the positive or negative side. The saturation of the integration circuit 40 can be corrected earlier by allowing the resistor 51 to increase the gain of the filter circuit 41. Similar effects can be exerted by inputting the rectangular wave 46 to a filter circuit 81 comprising a resistor 79 and a capacitor 80 and inputting an output from the filter circuit to the non-inverting input terminal of the operational amplifier 49 as shown in FIG. 4.

The triangular wave 37 and the voltage $Vf_U$ of temperature sensor $TD_U$ are compared with each other by the comparator 36 as in the case of the comparator 17. The comparator 36 outputs a PWM signal 54. At this time, for the PWM signal 54, the on pulse width decreases with increasing temperature, as in the case of the PWM signal 27.

The PWM signal 54 is transmitted to the low-voltage side through a current limiting resistor 55 and a photocoupler 56. A collector output from the photocoupler 56 is connected to a collector output from the photocoupler 32 and pulled up by a resistor 57. This connection results in the relationship between the PWM signals shown in FIG. 5. The low-voltage side operates based on the power supply voltage $V_L$ and the reference voltage $G_L$.

Figure 5:
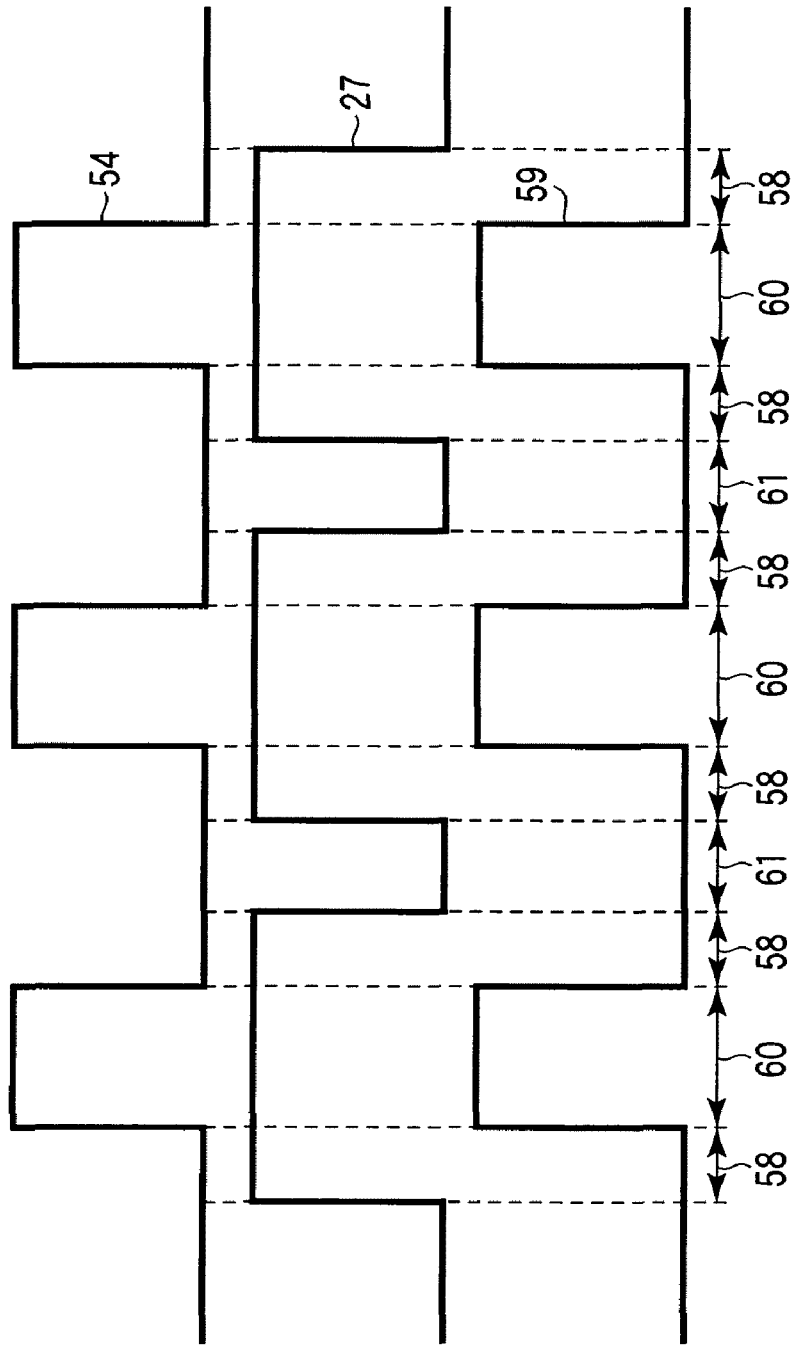
FIG. 5 is a diagram showing time series variations in PWM signals according to Embodiment 1 of the present invention.

Here, output signal operations of the photocouplers 56 and 32 will be described with reference to FIG. 5; in this case, switching element $S_U$ has a higher temperature than switching element $S_X$, by way of example. In this case, the PWM signal 54 has a shorter pulse width than the PWM signal 27. When the PWM signal 54 is low and the PWM signal 27 is high as in a period 58, the output transistor of the photocoupler 56 is on, whereas the output transistor of the photocoupler 32 is off. Thus, the junction of the photocoupler is set to the reference potential $G_L$. A PWM signal 59 is set to the low state. In a period 60, both the PWM signals 54 and 27 are in the high state. At this time, the output transistors of both the photocouplers are off. Thus, the PWM signal 59 is high. When both the PWM signals 54 and 27 are low as in a period 61, the output transistors of both the photocouplers are on. The PWM signal 59 is low. As a result of the above-described operation, the PWM signal 59 has a waveform the same as that of the PWM signal 54. The PWM signal from the hotter switching element is transmitted. In the present embodiment, two temperature detection circuits are provided by way of example. However, as described below, even with at least three temperature detection circuits, implementation of the same configuration allows only the PWM signal from the hottest switching element to be transmitted. Thus, even if the temperatures of a plurality of switching elements need to be detected, the controlling arithmetic apparatus requires only one input port.

Figure 6:
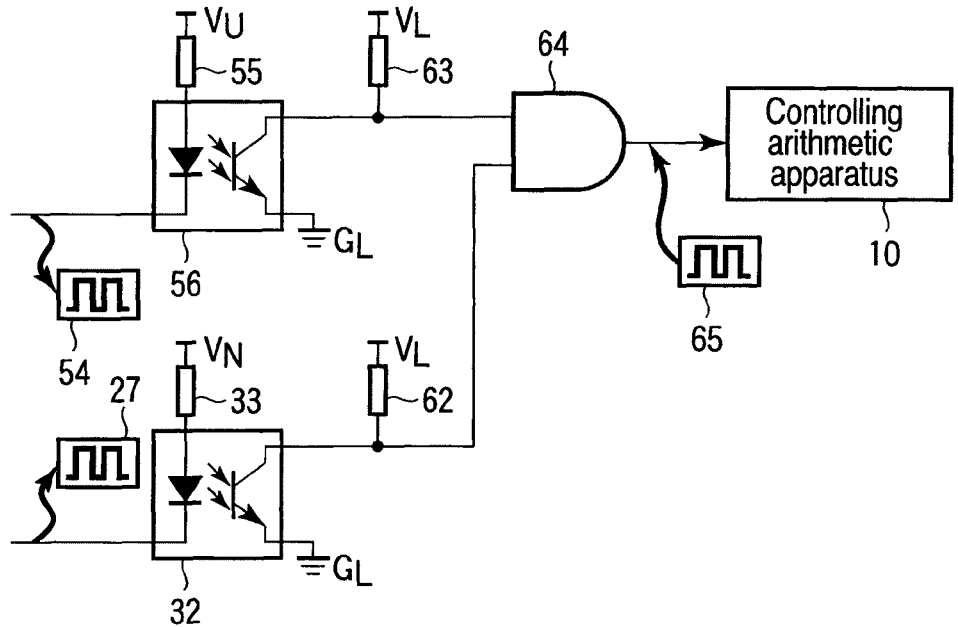
FIG. 6 is a diagram showing a temperature detection circuit using a logical circuit according to Embodiment 1 of the present invention.

As shown in FIG. 6, even when outputs from the photocouplers 32 and 56 are pulled up by the resistors 62 and 63, respectively, and the resultant outputs are input to an AND gate 64, the output PWM signal 65 is the same as the PWM signal 59. In this case, a logic IC is required, resulting in an increase in the number of components.

Finally, the PWM signal 59 or 65 is input to the controlling arithmetic apparatus 10, which then calculates the ratio of the on pulse width to the period of the pulse (hereinafter referred to as the duty ratio). The relationship between the switching element temperature and the duty ratio is pre-stored in the controlling arithmetic apparatus 10. This relationship is utilized to obtain the switching element temperature. At this time, the switching element temperature may be obtained utilizing only the on or off pulse width instead of the duty ratio.

Here, a circuit configuration will be described in which a temperature sensor and a temperature detection circuit are provided for each of all the switching elements in the inverter. If a temperature sensor is provided for each of all the switching elements and a corresponding temperature detection circuit is installed for each temperature sensor as shown in FIG. 1, then in the configuration shown in FIG. 2, a temperature detection circuit similar to the temperature detection circuit 34 is constructed for each of temperature sensors $TD_Y$ and $TD_W$. The square wave 25 generated by the triangular-wave generation circuit 16 is supplied to the input terminal of each temperature detection circuit. Furthermore, each of temperature sensors $TD_Y$ and $TD_Z$ is provided with a circuit in the temperature detection circuit 15 which is shown in the right of the figure, that is, the circuit comprising a comparator and a photointerrupter. The inverting input terminal of each comparator is supplied with the triangular wave 26 generated by the triangular wave generation circuit 16. Photointerrupter output terminals of all the temperature detection circuits are connected together are pulled up as shown in FIG. 2.

Furthermore, the following occurs if the temperature sensor and the temperature detection circuit are provided for each of all the switching elements as described above. When a large current flow through the switching element or reflux diode in the inverter 2, a large current also flows through the reference potential wire N, leading to a difference in reference potential $G_N$ between temperature sensors $TD_X$ and $TD_Y$ and $TD_Z$. As a result, the PWM waves generated by the comparators 17 may deviate from one another, making accurate temperature measurements difficult. In such a case, each of temperature sensors $TD_V$, $TD_W$, $TD_Y$, and $TD_Z$ is provided with a circuit similar to the temperature detection circuit 34. Furthermore, the input terminal of each temperature detection circuit is supplied with the square wave 25 generated by the triangular-wave generation circuit 16. The photointerrupter output terminals of all the temperature detection circuit are connected together and pulled up as shown in FIG. 2. This allows prevention of a possible deviation among the PWM waves generated by the temperature detection circuit.

Embodiment 2

In actuality, variations among the temperature sensors or among the detection circuits reduce the accuracy of detection of the switching element temperature. In the present embodiment, a method of improving the accuracy of temperature detection during operation of the inverter 2 will be described.

A variation in accuracy or the like among temperature sensors $TD_U$ to $TD_Z$ and among the temperature detection circuits leads to a variation in "temperature/duty ratio" relationship of the switching element. Applying the same "SW element temperature/duty ratio" relationship to the input PWM signal results in a reduction in the accuracy of detection of the switching element temperature. The variation problem can be avoided by applying the switching element temperature/duty ratio relationship adapted for each of temperature sensors $TD_U$ to $TD_Z$. However, it is necessary to determine which of the switching elements provides the PWM signal input indicating the hottest switching element to the controlling arithmetic apparatus 10.

Figure 7:
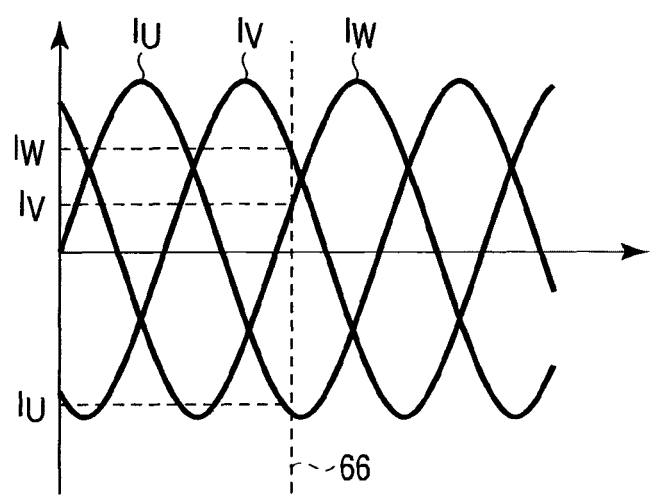
FIG. 7 is a diagram showing a current waveform obtained from a current sensor according to Embodiment 2 of the present invention.

A method for estimating the hottest switching element will be described with reference to FIG. 7. The current sensor 8 indicates currents $I_U$, $I_V$, and $I_W$ in the U, V, and W phases and the directions of the currents. For example, at a point in time indicated by a dotted line 66 in FIG. 7, the largest current flows in a negative direction. This current flows through switching element $S_X$. Thus, at this point in time, switching element $S_X$, included in switching elements $S_U$ to $S_Z$, is estimated to have the highest temperature. The controlling arithmetic apparatus 10 determines that the input PWM signal is from temperature sensor $TD_X$, and utilizes the temperature/duty ratio relationship of temperature sensor $TD_X$ to calculate the switching element temperature. That is, the controlling arithmetic apparatus 10 constantly or periodically detects the switching element through which the largest current flows based on currents $I_U$, $I_V$, and $I_W$ obtained from the current sensor 8. The controlling arithmetic apparatus 10 thus determines that the input PWM signal corresponds to the detected switching element temperature. The controlling arithmetic apparatus 10 then utilizes the temperature/duty ratio relationship of the element to calculate the temperature of the element. As described above, the successful estimation of the hottest switching element allows the switching element temperature to be accurately determined in spite of a variation in accuracy among the temperature sensors or among the detection circuits.

Embodiment 3

Figure 8:
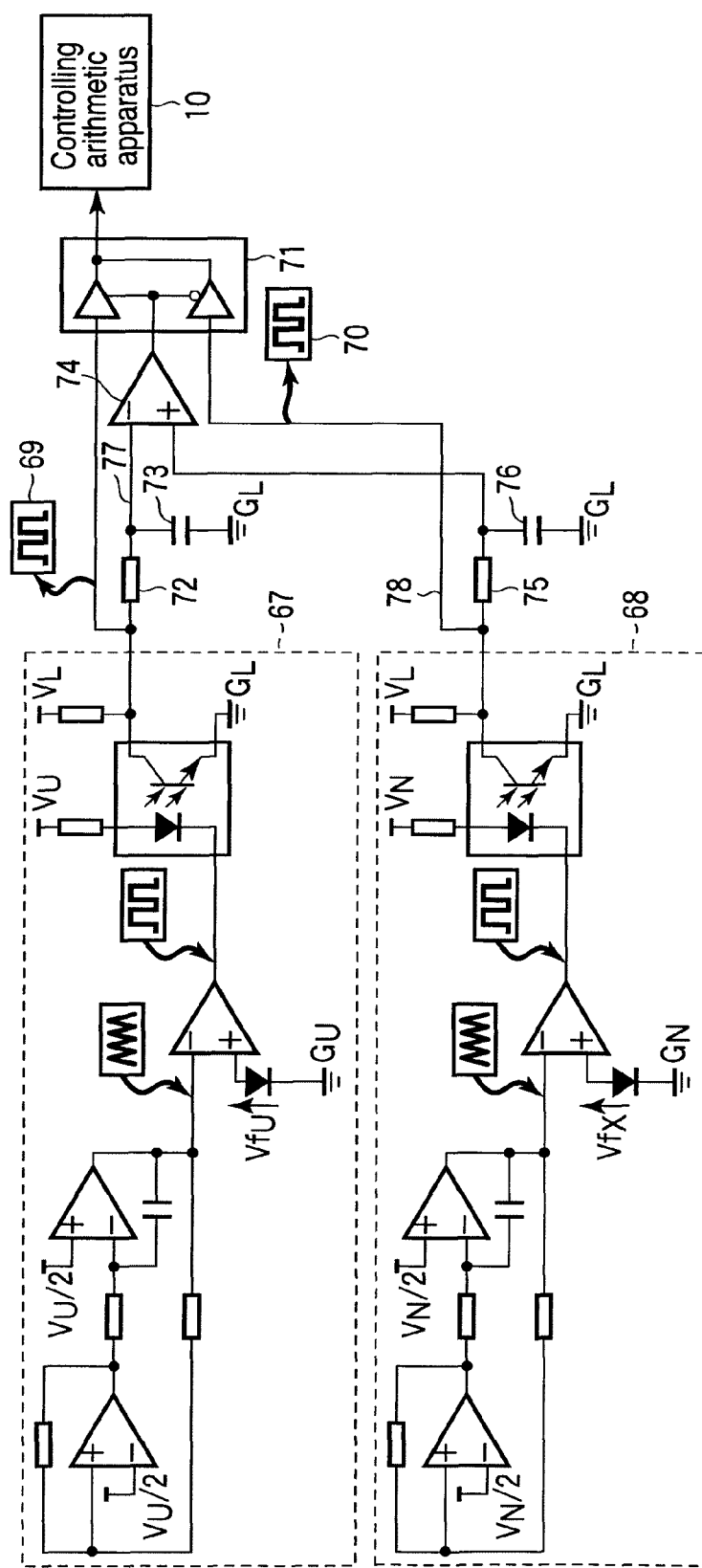
FIG. 8 is a diagram showing a temperature detection circuit according to Embodiment 3.

FIG. 8 shows an embodiment in which triangular waves generated by a plurality of temperature detection circuits avoid being synchronized with one another and in which the PWM signal from the switching element is input to the controlling arithmetic apparatus 10. Also in the present embodiment, the temperatures of the switching elements $S_U$ and $S_X$ are measured by way of example.

Circuits 67 and 68 having a configuration same as that of the temperature detection circuit 15 described in Embodiment 1 are installed in temperature sensors $TD_U$ and $TD_X$. PWM signals 69 and 70 insulated from the high-voltage side are input to a data selector 71. The PWM signal 69 is input to an inverting input terminal of a comparator 74 through an RC filter comprising a resistor 72 and a capacitor 73. The PWM signal 70 is similarly input to a non-inverting input terminal of the comparator 74 through a filter comprising a resistor 75 and a capacitor 76. A time constant for the filter circuit is set so as to allow the PWM signals 69 and 70 to be sufficiently smoothed. An output terminal of the comparator 74 is connected to a selection terminal of the data selector 71.

For example, if switching element $S_U$ has a higher temperature than switching element $S_X$, the PWM signal 69 has a lower on duty ratio than the PWM signal 70. A voltage signal 77 having passed through the corresponding filter circuit is lower than a voltage signal 78 having passed through the corresponding filter circuit. An output from the comparator 74 is set to the high state, and the data selector 71 allows the PWM signal 69 to pass through. As a result, the PWM signal 69 from hot switching element $S_U$ is transmitted to the controlling arithmetic apparatus 10. In contrast, if switching element $S_X$ has a higher temperature than switching element $S_U$, the data selector 71 allows the PWM signal 70 to pass through. To allow signal selection sensitivity to be adjusted, the comparator 74 may be provided with hysteresis.

Figure 9:
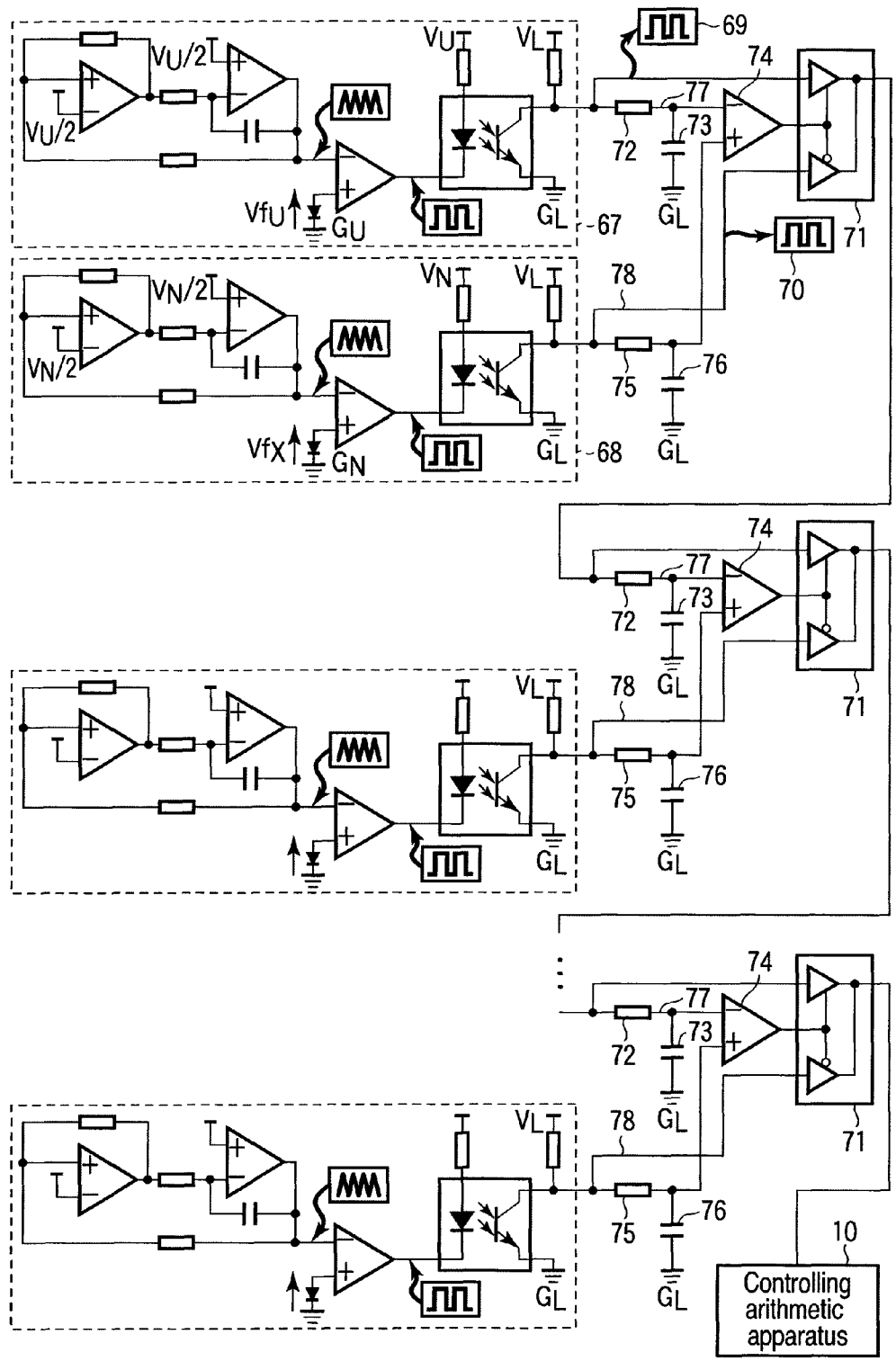
FIG. 9 is a diagram showing a configuration comprising at least three temperature sensors to measure the temperature of the hottest switching element based on asynchronous PWM signals.

As described above, the comparator and the data selector are used to transmit the PWM signal from the hot switching element. Even with at least three temperature sensors, a similar configuration can be used to allow only the PWM signal from the hottest switching element to pass through. FIG. 9 shows a configuration in which at least three temperature sensors and at least three temperature detection circuits are provided and in which PWM signals are asynchronously generated so that the temperature of the hottest switching element, indicated by the corresponding PWM signal, is measured.

However, if such a configuration as shown in FIG. 9 is adopted, the filter circuits serve to increase a time constant for signal selection. Thus, Embodiment 3 allows less accurate determination of whether or not the PWM signal transmitted to the controlling arithmetic apparatus 10 is from the temperature sensor indicating the highest temperature, than Embodiment 1. Hence, the time constant for the filter circuit is set to the minimum one of the values that allow the PWM signal to be sufficiently smoothed. Furthermore, a technique is also used in which the temperature sensor indicating the highest temperature is estimated based on the magnitudes and directions of the currents as in the case of Embodiment 2, and the time constant for the filter circuit is taken into account. Then, the temperature sensor indicating the highest temperature can be accurately estimated to allow and the temperatures of the elements to be calculated.

Embodiment 4

In the present embodiment, a measure for improving the accuracy of the temperature detection circuit will be described. In the temperature detection circuit in FIG. 2, a variation occurs in an intermediate voltage $V_N/2$ used for the triangular-wave generation circuit 16 and in an intermediate voltage $V_U/2$ used for the insulation-side comparator 39, depending on the accuracy of the power supply voltage and voltage dividing resistance. As a result, the temperature-duty ratio relationships of the PWM signals 27 and 54, known as temperature detection signals, become different from each other. This reduces the temperature detection accuracy.

Figure 10:
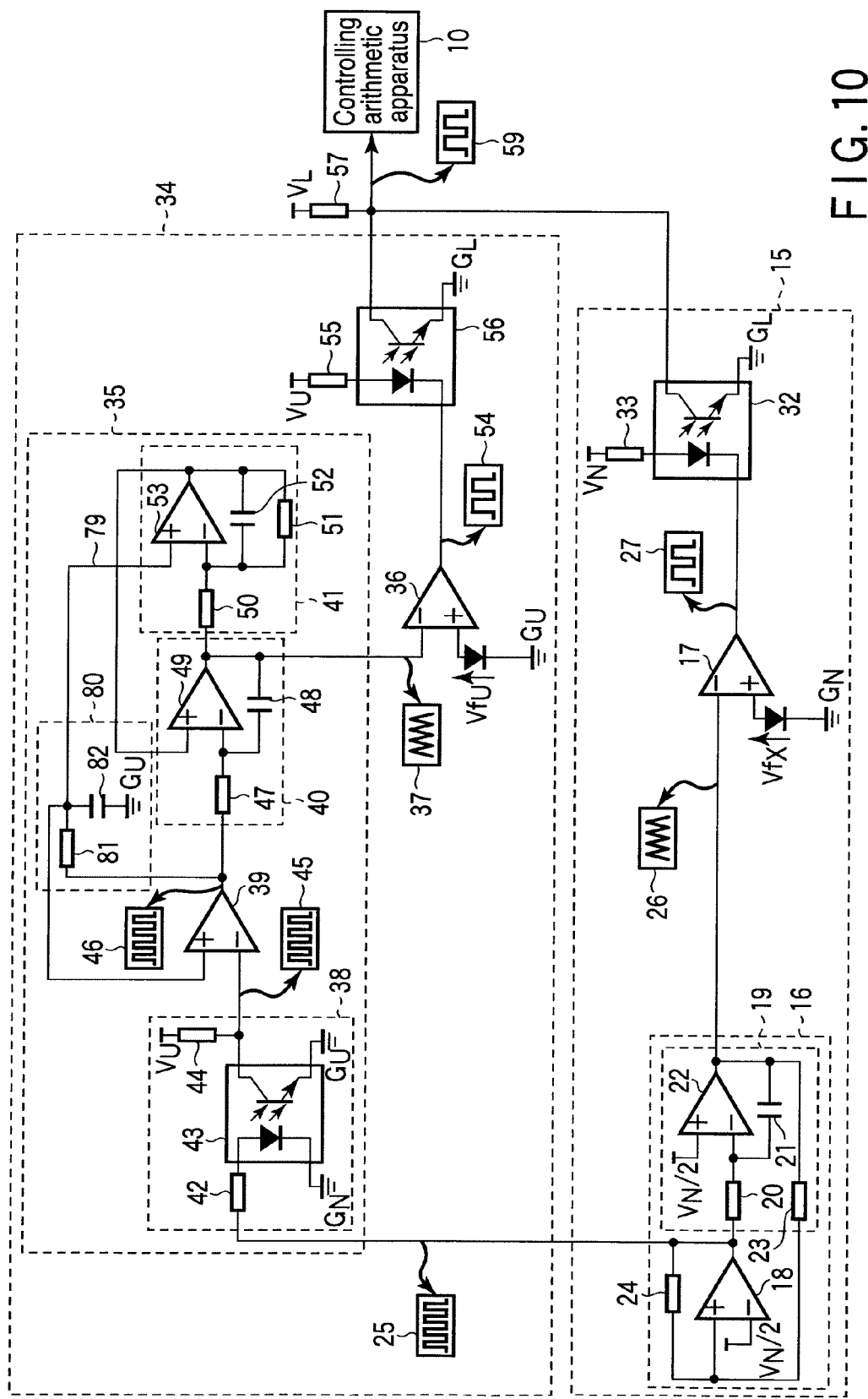
FIG. 10 is a diagram showing a temperature detection circuit according to Embodiment 4 of the present invention.

When the temperature detection circuit in FIG. 2 is improved as shown in FIG. 10, the temperature detection accuracy is increased. The temperature detection circuit in FIG. 2 is modified such that a filter circuit 80 is added which smoothes the square wave 46 into a DC voltage 79 and such that the output DC voltage 79 is input to the non-inverting input terminals of the comparator 39 and the operational amplifier 53. In the present embodiment, the filter circuit 80 comprises a resistor 81 and a capacitor 82 but may be configured in any manner provided that the circuit 80 allows the square wave 46 to be smoothed into a DC voltage.

The square wave 46 has a waveform the same as that of the square wave 25. The average voltage of the square wave 25 is equal to the intermediate voltage $V_N/2$. That is, the average voltage of the square wave 46 is equal to the intermediate voltage $V_N/2$, so that the DC voltage 79, obtained by smoothing the square wave 46, represents a potential the same as that of the intermediate voltage $V_N/2$. Namely, the square wave 46 with a duty ratio of exactly 50% can be generated by using accurate voltage dividing resistance only for the intermediate voltage $V_N/2$ used for the triangular-wave generation circuit 16, while avoiding the use of accurate voltage dividing resistance for the insulation-side circuit 34. When the DC voltage 79 thus obtained is input to the non-inverting input terminal of the operational amplifier 53, a variation in the temperature-duty ratio relationship is suppressed. Hence, the temperature detection accuracy is improved. Moreover, inputting the DC voltage 79 to the non-inverting input terminal of the comparator 39 eliminates the need to produce an intermediate voltage based on voltage dividing resistance. This leads to a reduction in costs.

The above description relates to the embodiments of the present invention and does not limit the apparatus and method according to the present invention. Various modifications of the embodiments can be easily implemented.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A temperature detection circuit comprising a first temperature detection circuit section including a first temperature sensor, and a second temperature detection circuit section including a second temperature sensor and insulated from the first temperature detection circuit section, wherein:

the first temperature detection circuit section further comprises:
a first comparison circuit configured to output a first square wave;
a first integration circuit configured to integrate the first square wave to output a first triangular wave;
a second comparison circuit configured to compare the first triangular wave with a temperature value obtained from the first temperature sensor to output a first PWM signal; and
a first insulation circuit configured to insulate the first PWM signal to output a second PWM signal corresponding to the first PWM signal, the second temperature detection circuit section further comprises:
a second insulation circuit configured to insulate the first square wave to output a second square wave corresponding to the first square wave;
a second integration circuit configured to integrate the second square wave to output a second triangular wave;
a third comparison circuit configured to compare a temperature value obtained from the second temperature sensor with the second triangular wave to output a third PWM signal; and
a third insulation circuit configured to insulate the third PWM signal to output a fourth PWM signal corresponding to the third PWM signal, and the temperature detection circuit further comprises arithmetic means for calculating a higher one of the temperatures detected by the first and second temperature sensors based on the second and fourth PWM signals output by the first and third insulation circuits, respectively.

2. The temperature detection circuit according to claim 1, wherein the second integration circuit comprises an operational amplifier, the temperature detection circuit further comprises:

shift means for shifting a potential of the second square wave in a low state output by the second insulation circuit, to a circuit reference potential to output a third square wave;

a resistor connected between an output of the shift means and an inverting input terminal of the operational amplifier;

a capacitor connected between the inverting input terminal and an output terminal of the operational amplifier; and a filter circuit configured to smooth the second triangular wave or the third square wave, wherein an output from the filter circuit is connected to a non-inverting input terminal of the operational amplifier.

3. The temperature detection circuit according to claim 1, wherein each of the first and third insulation circuits comprises an open collector or open drain type transistor output photocoupler, and outputs from the photocouplers are connected together, and the arithmetic means calculates temperature based on a PWM signal obtained from the junction.

4. The temperature detection circuit according to claim 2, wherein each of the first and third insulation circuits comprises an open collector or open drain type transistor output photocoupler, and outputs from the photocouplers are connected together, and the arithmetic means calculates temperature based on a PWM signal obtained from the junction.

5. The temperature detection circuit according to claim 1, wherein the arithmetic means comprises means for receiving one of PWM signals output by the first and third insulation circuits which indicates of a higher temperature, means for determining which of the first and second temperature sensors has detected the higher temperature, and means for calculating the temperature of the sensor having detected the higher temperature based on a relationship between a PWM signal duty ratio and the temperature for the temperature sensor having detected the higher temperature.

6. The temperature detection circuit according to claim 2, wherein the arithmetic means comprises means for receiving one of PWM signals output by the first and third insulation circuits which indicates of a higher temperature, means for determining which of the first and second temperature sensors has detected the higher temperature, and means for calculating the temperature of the sensor having detected the higher temperature based on a relationship between a PWM signal duty ratio and the temperature for the temperature sensor having detected the higher temperature.

7. The temperature detection circuit according to claim 3, further comprising means for smoothing a third square wave to obtain a DC voltage signal, and means for setting the DC voltage signal to be a reference voltage for an inversion filter circuit and a shift means.

8. The temperature detection circuit according to claim 5, further comprising means for smoothing a third square wave to obtain a DC voltage signal, and means for setting the DC voltage signal to be a reference voltage for an inversion filter circuit and a shift means.

* * * * *